(12) United States Patent
Reineman et al.

(10) Patent No.: US 9,242,429 B2
(45) Date of Patent: Jan. 26, 2016

(54) ACTIVATED THREAD CURING OF LIQUID ADHESIVES

(71) Applicant: Apple Inc., Cupertino, CA (US)

(72) Inventors: Samuel T. Reineman, Cambridge, MA (US); Kevin D. Gibbs, Menlo Park, CA (US); Amy Qian, Cupertino, CA (US); Derek W. Wright, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 185 days.

(21) Appl. No.: 13/911,029

(22) Filed: Jun. 5, 2013

(65) Prior Publication Data

US 2014/0272332 A1    Sep. 18, 2014

Related U.S. Application Data

(60) Provisional application No. 61/785,353, filed on Mar. 14, 2013.

(51) Int. Cl.
*B32B 3/10* (2006.01)
*B32B 7/06* (2006.01)
(Continued)

(52) U.S. Cl.
CPC ... *B32B 7/06* (2013.01); *B32B 3/10* (2013.01); *B32B 5/24* (2013.01); *B32B 7/045* (2013.01); *B32B 7/12* (2013.01); *B32B 37/12* (2013.01); *C09J 5/00* (2013.01); *B29C 65/342* (2013.01); *B29C 65/348* (2013.01); *B29C 65/3468* (2013.01); *B29C 65/3484* (2013.01); *B29C 65/488* (2013.01); *B29C 65/4835* (2013.01); *B29C 65/4845* (2013.01); *B29C 65/5035* (2013.01); *B29C 65/5057* (2013.01); *B29C 65/5092* (2013.01); *B29C 65/524* (2013.01);

(Continued)

(58) Field of Classification Search
CPC ............. Y10T 428/24777; Y10T 428/24793; Y10T 428/24802; Y10T 428/24826; Y10T 428/24851; Y10T 428/24868; B65C 65/34; B65C 65/3404; B65C 65/342; B65C 65/3432; B65C 65/483; B65C 65/4835; B65C 65/4845
See application file for complete search history.

(56) References Cited

U.S. PATENT DOCUMENTS 5,243,162 A * 9/1993 Kobayashi .................. 200/512
7,901,532 B2   3/2011 Bain et al.
(Continued)

FOREIGN PATENT DOCUMENTS

DE        10245564 A1 * 4/2004
WO        WO 0119937 A1 * 3/2001

*Primary Examiner* — Gerard Higgins
(74) *Attorney, Agent, or Firm* — Downey Brand LLP

(57) ABSTRACT

Structures and methods for providing a liquid adhesive between substrates of a composite structure are described. Methods include providing a liquid adhesive having a thread disposed therein between two substrates of a composite structure. In some embodiments, the thread has a fixed diameter which acts to provide a consistent gap between the two substrates. In some embodiments, the thread is configured to be activated during the assembly process to facilitate curing of the liquid adhesive. In some embodiments the thread is configured to be activated after the composite structure is formed to facilitate separation of the two substrates and disassembly of the composite structure. The thread can be made of a conductive or non-conductive material. In some embodiments, the thread is activated by passing a voltage through the thread to heat the thread. In some embodiments, the thread is activated by passing ultraviolet light through the thread.

28 Claims, 15 Drawing Sheets

(51) Int. Cl.
  *B32B 7/04* (2006.01)
  *B32B 7/12* (2006.01)
  *B32B 37/12* (2006.01)
  *C09J 5/00* (2006.01)
  *B32B 5/24* (2006.01)
  *B29C 65/34* (2006.01)
  *B29C 65/48* (2006.01)
  *B29C 65/50* (2006.01)
  *B29C 65/52* (2006.01)
  *B29C 65/78* (2006.01)
  *B29C 65/00* (2006.01)
  *F16B 11/00* (2006.01)
  *B29L 31/34* (2006.01)

(52) U.S. Cl.
  CPC ......... *B29C 65/7826* (2013.01); *B29C 66/1122* (2013.01); *B29C 66/45* (2013.01); *B29C 66/8322* (2013.01); *B29L 2031/3475* (2013.01); *B32B 2307/202* (2013.01); *B32B 2457/208* (2013.01); *F16B 11/006* (2013.01); *Y10T 156/10* (2015.01); *Y10T 156/1051* (2015.01); *Y10T 428/24802* (2015.01); *Y10T 428/24851* (2015.01)

(56) References Cited

U.S. PATENT DOCUMENTS

| | | | |
|---|---|---|---|
| 8,071,874 | B2 | 12/2011 | Beckenbaugh et al. |
| 2002/0134543 | A1 | 9/2002 | Estes et al. |
| 2011/0307723 | A1* | 12/2011 | Cupps et al. .................. 713/322 |

* cited by examiner

ACTIVATED THREAD CURING OF LIQUID ADHESIVES

CROSS-REFERENCE TO RELATED APPLICATIONS

This application claims the benefit of U.S. Provisional Patent Application No. 61/785,353, filed Mar. 14, 2013, and entitled "ACTIVATED THREAD CURING OF LIQUID ADHESIVES," which is incorporated herein by reference in its entirety for all purposes.

FIELD OF THE DESCRIBED EMBODIMENTS

The described embodiments relate generally to liquid adhesives used to bond substrates. More particularly, methods for providing a consistent gap between substrates bonded together using liquid adhesives and for curing liquid adhesives between substrates are described.

BACKGROUND

Liquid adhesives, such as liquid optically clear adhesives (LOCAs), are used in a wide variety of electronic assemblies. For example, liquid adhesive can be used to bond a touch panel to a main liquid crystal display. Liquid adhesive can also be used to bond a protective cover, such as a cover glass or lens, to a touch panel. The use of liquid adhesives to bond substrates in display assemblies, in particular, has a number of advantages. For example, liquid adhesive can improve the durability of a display assembly. In addition, use of liquid adhesive make the display assembly more easy to rework compared to assemblies bonded using adhesive tape.

Since liquid adhesives are in liquid form, they can require special care when applying them to substrates. In particular, care should be taken to ensure that the introduction of bubbles or voids between the substrates is avoided. In addition, care should be taken to avoid inconsistent curing of the liquid adhesive in different locations of the substrates so as to prevent distortions, visible defects in the final product. In addition, pressure applied to the substrates during a curing process should be consistent in order to provide a consistent gap between the substrates. If multiple substrates are bond together in a stack, any inconsistencies in the gaps between the substrates can be exacerbated. This could lead to different stacks having different overall thicknesses, also referred to as Z-height. These factors and others can make it difficult to control process parameters related to liquid adhesive applications in a manufacturing setting. Inconsistent process parameters can lead to high part rejection rates or defects in the visual quality of the final product.

SUMMARY

This paper describes various embodiments that relate liquid adhesives. Improved methods for applying and curing liquid adhesives between two or more substrates are described.

According to one embodiment described herein, a method of forming a composite structure having a first substrate and a second substrate is described. The method can include dispensing a liquid adhesive conglomerate onto a portion of a first surface of the first substrate. The liquid adhesive conglomerate can include a compressible liquid adhesive portion and a rigid thread structure incorporated within the compressible adhesive portion. The rigid thread structure has a diameter that remains substantially fixed during a subsequent curing process. The method then includes aligning a second surface of the second substrate with respect to the first surface. Next, pressure is applied to press the first and second surfaces together. During the pressing, a gap is formed between the first and second substrates in accordance with the diameter of the rigid thread structure. Also during the pressing, the rigid thread structure can be activated to cure the liquid adhesive. In some embodiments, the thread can be activated after the pressure is removed. After the liquid adhesive is cured, the distance of the gap remains in accordance with the diameter of the rigid thread structure.

According to another embodiment, a composite structure is described. The composite structure includes a first substrate having a first surface and a second surface having a second surface. The composite structure also includes a liquid adhesive positioned between the first and second surfaces. The liquid adhesive is configured to be cured when exposed to ultraviolet light, heat and/or moisture. The composite structure also includes a rigid thread structure having a substantially fixed diameter positioned within the liquid adhesive and between the first and second surfaces. A gap formed between the first and second surfaces has a distance in accordance with the substantially fixed diameter of the rigid thread structure. The rigid thread structure is configured to be activated to cure at least a portion of the liquid adhesive during a curing process.

According to another embodiment, a method of forming a composite structure having a compressible tube is described. The method includes dispensing a liquid adhesive and a tube onto a portion of a first surface of a first substrate. The tube has a central cavity and a number of apertures formed through an outer surface to an inner surface of tube. The liquid adhesive is dispensed through the central cavity and the apertures onto the first surface. The tube has a compressible diameter that is compressible to a predetermined thickness. Next, a second surface of a second substrate is aligning with respect to the first surface. Then, pressure is applied to the substrates to press the substrates together and the liquid adhesive is cured. During the pressing, the tube is collapsed to the predetermined thickness to form a gap between the substrates in accordance with the predetermined thickness. After the liquid adhesive is cured, the distance of the gap remains in accordance with the predetermined thickness.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; that is, other embodiments may be used, and changes may be made without departing from the spirit and scope of the described embodiments.

Described herein are structures and methods for improving assembly processes involving the use of liquid adhesives. Liquid adhesives are generally used in displays and touch panel applications to bind various substrates to each other, such as cover glasses/lenses to sensor units. The use of liquid adhesives can improve the optical characteristics of the devices as well as improve other attributes such as durability when compared to the use of traditional adhesives such as adhesive tapes. In some applications, the liquid adhesives are opaque. In other applications, the liquid adhesives are transparent, referred to as liquid optically clear adhesives (LOCAs).

Figure 1:
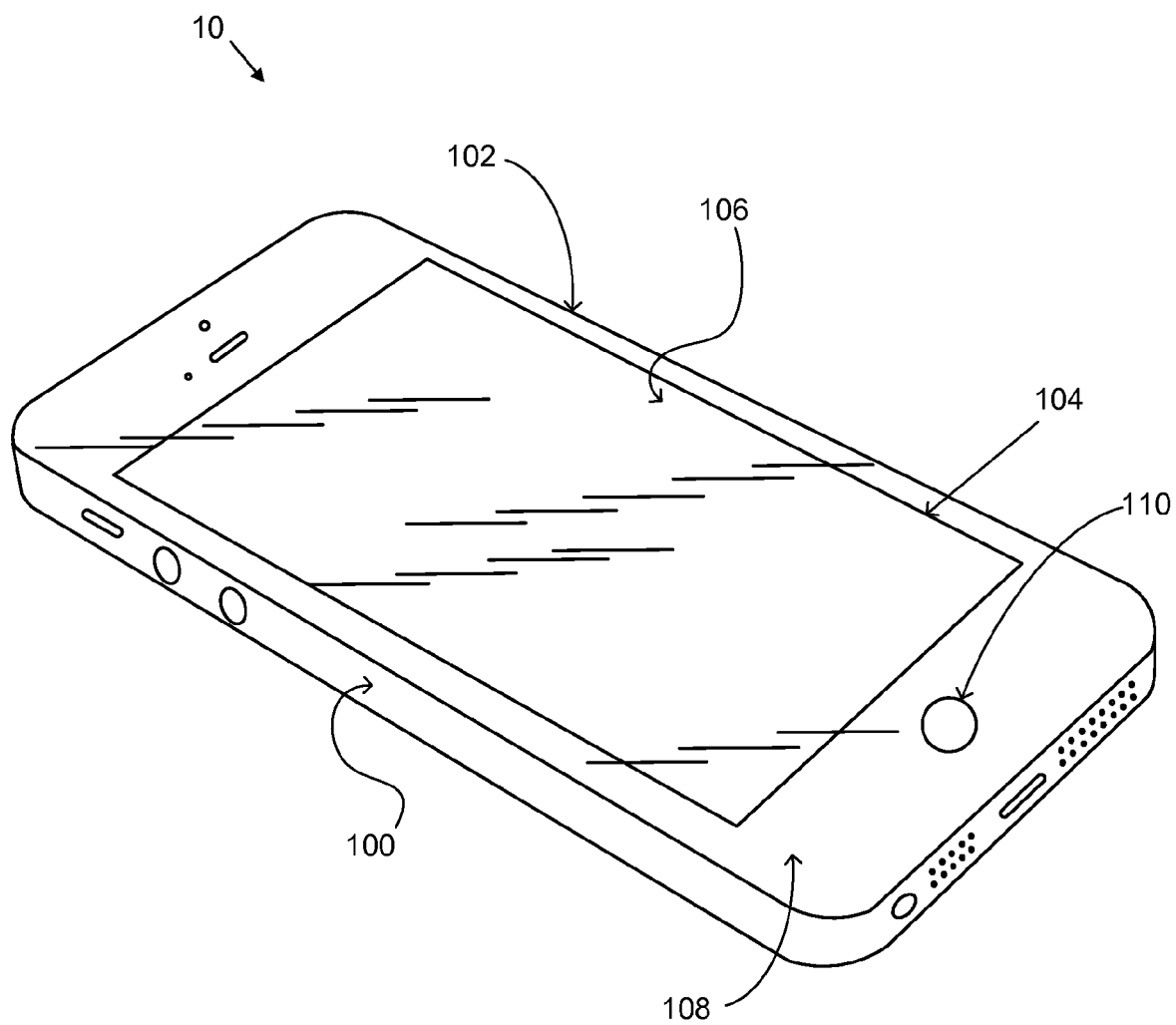
FIG. 1 shows a perspective view of a portable electronic device having a touch panel screen.

Methods described are well suited for manufacture of displays and touch panel screens as part of computing devices including desktop computers, laptop computers, smart phones and media players, such as those designed and sold by Apple Inc. headquartered in Cupertino, Calif. FIG. 1 shows a perspective view of a fully assembled portable electronic device 10 in accordance with an embodiment described herein. Portable electronic device 10 can be sized for one-handed operation and placement into small areas such as a pocket or purse, i.e., portable electronic device 10 can be a handheld electronic device. By way of example, the portable electronic device 10 may correspond to a computer, media device, telecommunication device and/or the like. The portable electronic device 10 can generally correspond to a smart phone, music player, game player, video player, personal digital assistant (PDA), and/or the like.

Portable electronic device 10 includes a housing 100 configured to at least partially enclose any suitable number of components associated with portable electronic device 10. For example, housing 100 may enclose and support internally various electrical components (including integrated circuit chips and other circuitry) to provide computing operations for the device. In one embodiment, housing 100 is integrally formed in such a way as to constitute a single complete unit. Housing 100 can be formed of any number of materials including for example plastics, metals, ceramics and the like.

Portable electronic device 10 also includes a cover glass 106 that has a planar outer surface. The outer surface can for example be flush with an edge 102 of the housing wall that surrounds the edge of the cover. Cover glass 106 cooperates with housing 100 to enclose portable electronic device 10. Although cover glass 106 can be situated in a variety of ways relative to housing 100, in the illustrated embodiment, cover glass 106 is disposed within and proximate the mouth of the cavity of the housing 100. That is, cover glass 106 fits into an opening 108. In one embodiment, cover glass 106 is a protective top layer of transparent or semitransparent material (clear) such that a display screen 104 is visible through cover glass 106. That is, cover glass 106 can serve as a window for display screen 104 (i.e., the transparent cover overlays the display screen). Display screen 104 can be used to display a graphical user interface (GUI) as well as other information to the user (e.g., text, objects, graphics, etc.). Display screen 104 can be part of a display unit (not shown) that is assembled and contained within housing 100. Cover glass 106 can be formed from glass, transparent resinous material or other transparent materials. In particular embodiments, cover glass 106 is highly polished to give portable electronic device 10 a shiny look. Cover glass 106 can include a hole to accommodate a user clickable input button 110 (home button) that can be used to provide a user input event to the portable electronic device 10.

In one embodiment, the viewing region may be touch sensitive for receiving one or more touch inputs that help control various aspects of what is being displayed on the display screen. In some cases, the one or more inputs can be simultaneously received (e.g., multi-touch). In these embodiments, one or more touch sensing layers (not shown) can be located below cover glass 106. A touch sensing layer can for example be disposed between the cover glass 106 and display screen 104. In some cases, the touch sensing layer is applied to display screen 104 while in other cases the touch sensing layer is applied to cover glass 106. The touch sensing layer may for example be attached to the inner surface of cover glass 106. The touch sensing layer generally includes a number of sensors that are configured to activate as a user's finger touches the upper surface of cover glass 106. In the simplest case, an electrical signal is produced each time the finger passes a sensor. The number of signals in a given time frame may indicate location, direction, speed and acceleration of the finger on the touch sensitive portion, i.e., the more signals, the more the user moved his or her finger. In most cases, the signals are monitored by an electronic interface that converts the number, combination and frequency of the signals into location, direction, speed and acceleration information. This information may then be used by the portable electronic device 10 to perform the desired control function relative to the display screen 104.

Figure 2:
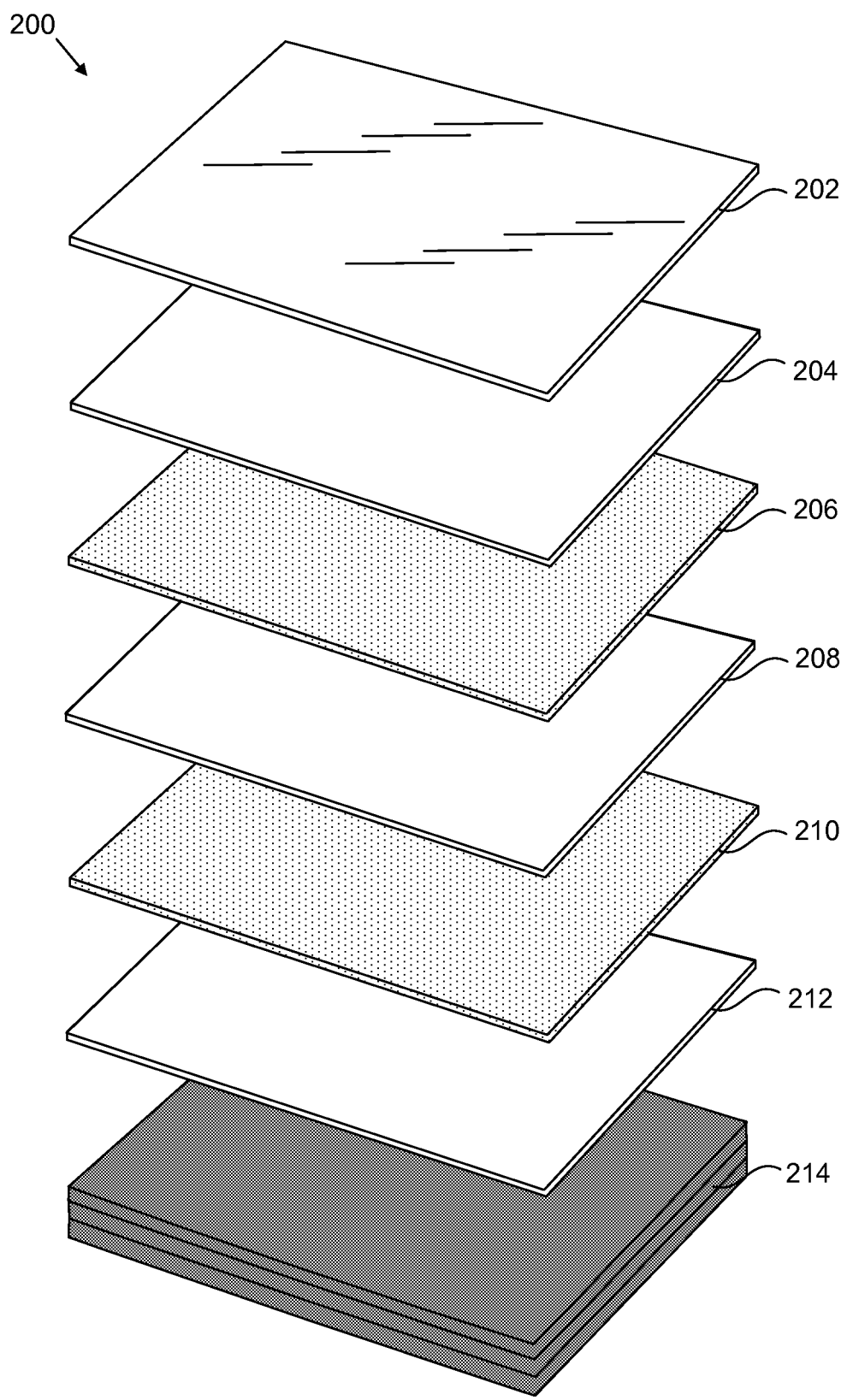
FIG. 2 shows an exploded view of a display assembly having liquid adhesive positioned between multiple substrates.

Touch sensitive display assemblies, such as the display assembly of portable electronic device 10, generally include a number of stacked layers. FIG. 2 shows an exploded view of display assembly 200. Display assembly 200 can include a cover glass or lens 202, touch sensitive or display panels 206 and 210, liquid crystal display (LCD) stack 214 and liquid adhesive layers 204, 208 and 212. Liquid adhesive layers 204, 208 and 212 are disposed between and used to bond adjacent layers together to form the stacked layers of display assembly 200. Touch sensitive panels 206 and/or 210 are typically comprised of a conductive metal oxide and includes a number of sensors that are configured to activate as a user's finger, as described above.

During a typical liquid adhesive assembly process, liquid adhesive layer 204 can be applied onto cover glass 202 using a dispensing procedure. In some cases, two different types of liquid adhesives are disposed onto cover glass 202, a high viscosity liquid adhesive and a low viscosity liquid adhesive. The high viscosity liquid adhesive is often referred to as a dam liquid adhesive since it is used to contain and prevent or minimize the spreading or overflowing of the low viscosity liquid adhesive. The dam liquid adhesive is typically dispensed in a bead or a line around a perimeter region of cover glass 202, thereby minimizing the overflow of the subsequently applied low viscosity liquid adhesive dispensed in the interior portions of cover glass 202. Next, touch sensitive panel 206 is aligned with cover glass 202 under ambient or vacuum conditions. Then, pressure is applied to touch sensitive panel 206 and cover glass 202 while liquid adhesive 204 is cured. During the curing process the liquid adhesive is hardening using any of a number activating agents depending upon the type of liquid adhesive being used. For example, some liquid adhesives are cured using ultraviolet (UV) light while others are cured using heat or moisture. Some liquid adhesives are curable using UV light, heat and/or moisture. Once liquid adhesive 204 is cured, the adhesive is no longer in liquid form and will bond the corresponding substrates (touch sensitive panel 206 and cover glass 202) together. Note that after liquid adhesive 204 is cured, there exists a gap between touch sensitive panel 206 and cover glass 202 that is associated with the thickness of liquid adhesive layer 204. The distance of the gap can depend on several factors including the type and amount of the liquid adhesive used and the amount of pressure applied to the substrates during the curing process.

In some cases, the substrates are temporarily fixed using a partial curing process where the liquid adhesive is partially cured. In some cases partial curing involves curing the liquid adhesive in select areas. This process is often referred to as a "pre-curing" process. After pre-curing, visual inspection can be conducted to check the quality of the adhesive bond. If the bond is defective due to a defect (such as bubble, foreign particles, mis-alignment, etc.), the substrates can be taken apart and the adhesive cleaned off using a solvent. After cleaning, the substrates can be re-assembled. If there is no defect in the bond, the substrates can undergo a final curing process where substantially all liquid adhesive 204 is cured. After touch sensitive panel 206 and cover glass 202 are adhered together, subsequent curing processes are used to add on touch sensitive panel 210 and LCD 214 using liquid adhesive layers 208 and 212, respectively. Once fully assembled, the resultant assembled display assembly 200, also referred to as a composite layered structure, has an overall thickness that can be referred to as the Z-height. The Z-height of the fully assembled display assembly 200 includes the thicknesses of the composite layered structure, which includes the thicknesses of the substrates (cover glass 202, touch sensitive panels 206 and 210, LCD stack 214) as well as the gaps between the substrates associated with liquid adhesive layers 204, 208 and 212. The distance of the gaps between the substrates are established during the curing processes of liquid adhesives 204, 208 and 212.

One issue that can occur during a curing process is that the gap distance between two adjacent substrates can be non-uniform. That is, there can be portions of the composite layered structure where the gap distance is thinner than in other portions of the composite layered structure. A non-uniform gap can cause visual inconsistencies of the composite layered structure. If the composite layered structure includes multiple substrates, the accumulation of non-uniform gaps can exacerbate the visual inconsistencies.

Another issue that can occur during a curing process is that some portions of the liquid adhesive can cure faster than other portions. As described above, liquid adhesives can be cured by applying an activating agent, such as UV light, heat and/or moisture. UV-cured liquid adhesives are popular since they generally cure quickly, typically in seconds or minutes, and work well with many substrates. However, one of the inherent drawbacks of UV-cured liquid adhesives is that the liquid adhesive can require direct exposure to a UV light source to initiate the cure. Thus, portions that are exposed to more UV light such as edge portions or top surface portions can cure faster than those portions that are exposed to less UV light. This uneven curing can create regions of the adhesive that have different optical properties that are visibly noticeable.

Structures and methods described in this paper are used to solve issues associated with assembly processes which include liquid adhesive, such as the issues described above. It should be noted that the structures and methods described herein are not limited to display or touch screen applications. That is, they can be used to bond any types and numbers of substrates together. In addition, as used herein, the term composite layered structure is not limited to any particular number of substrates bonded by adhesive. That is, a composite layered structure can be used to refer to two or more substrates bonded together. Furthermore, structures and methods described herein are not limited to transparent or clear liquid adhesives. That is, in certain applications the liquid adhesive is opaque or partially opaque.

Embodiments described herein involve the use of one or more wires or threads disposed within a liquid adhesive and between substrates. In some embodiments, the wires or threads can be used to provide a uniform gap between the substrates during a pre-curing or curing process. In some embodiments, the wires or thread are configured to be activated during a pre-curing or curing process in order to cure or assist in the curing of liquid adhesive. These and other advantages related to providing one or more wires or threads within a liquid adhesive will be described below with reference to FIGS. 3-13.

Figure 3:
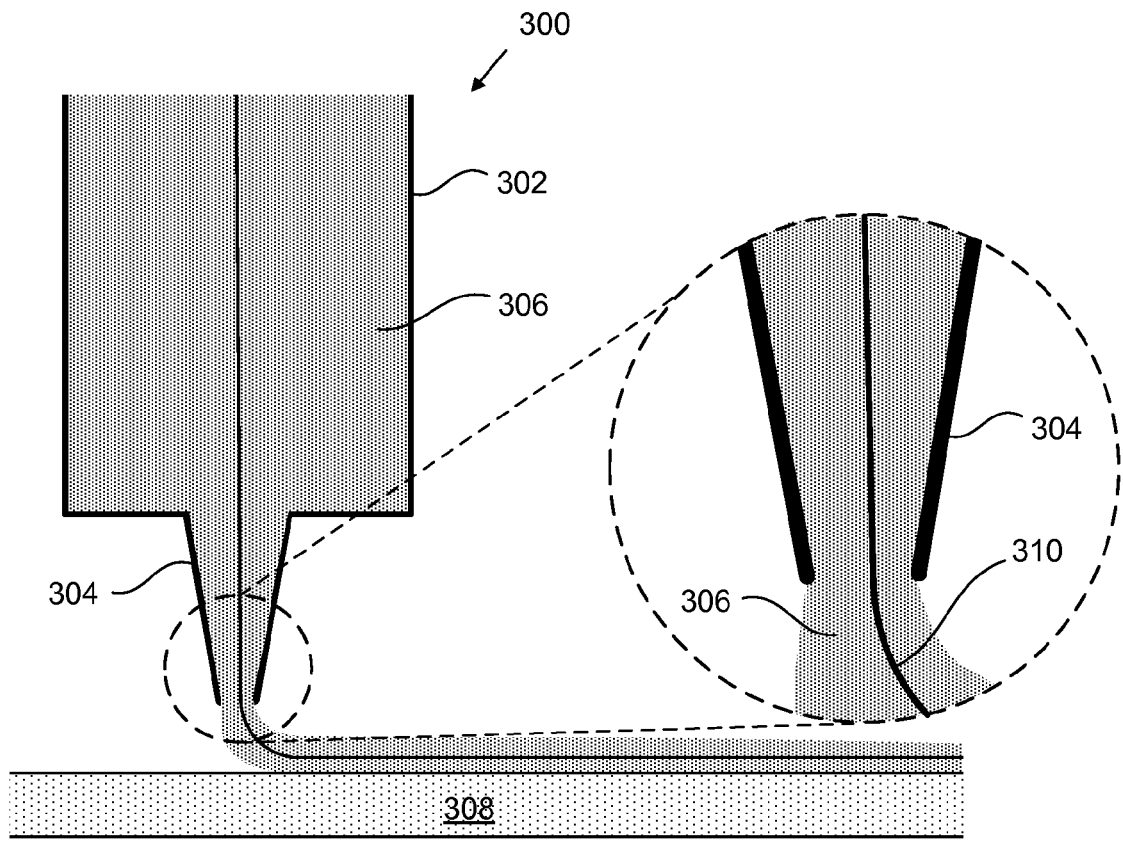
FIG. 3 shows a liquid adhesive dispensing assembly in accordance with some described embodiments.

FIG. 3 shows a liquid adhesive dispensing assembly 300 in accordance with some described embodiments. Liquid adhesive dispensing assembly 300 includes dispenser 302 and tapered dispensing tip 304. Liquid adhesive dispensing assembly 300 is configured to dispense liquid adhesive 306 onto substrate 308, either manually or automatically using, for example, a robot. In the embodiment shown, liquid adhesive 306 is forced through dispensing tip 304 and dispensed in a long beaded form onto substrate 308. The elongated beaded form of liquid adhesive can be well suited in an application of a dam liquid adhesive, such as described above. Within liquid adhesive 306 is thread 310 which, in the embodiment shown in FIG. 3, is dispensed with liquid adhesive 306 onto substrate 308. Liquid adhesive 306 along with thread 310 can be referred to as a liquid adhesive conglomerate. In preferred embodiments, thread 310 has a certain level of stiffness in order to suitably feeding thread 310 through tip 304. Thus, in some embodiments thread 310 can be referred to as a rigid thread structure. Viscous forces from liquid adhesive 306 can feed and center thread 310 through the dispensing tip 304. That is, the flow of liquid adhesive 306 can carry thread 310 through dispensing tip 304 such that a separate thread feeding mechanism is not necessary. In alternative embodiments, thread 310 can be introduced into liquid adhesive 306 in a separate feed in a separate step. Some of these embodiments are described below with reference to FIGS. 6A-6C.

Thread 310 can be any suitable thin strand of material and can be also referred to as a wire, filament, strand, line or cable. Thread 310 can be made of a conductive material such as a metal-containing material. In other embodiments, thread 310 is made of a non-conductive material, such as a plastic material or fiber material. Thread 310 can be made of a single material or a combination of materials. For example, thread 310 can be made of a metal wire having a plastic sheath or a plastic cable with a metal sheath. Thread 310 is preferably made of a sufficiently flexible material which can bend and conform to a shape while being dispensed onto or formed on substrate 308. In some embodiments, thread 310 is made of a sufficiently rigid material so as to maintain a substantially fixed diameter during a pressing and curing process. In other embodiments, thread 310 is made of a less rigid material that can compress to a predefined diameter during a subsequent pressing and curing process. Embodiments where thread 310 made of rigid and compressible materials are described in detail below with reference to FIGS. 5A, 5B and 12A-12E.

Figure 4:
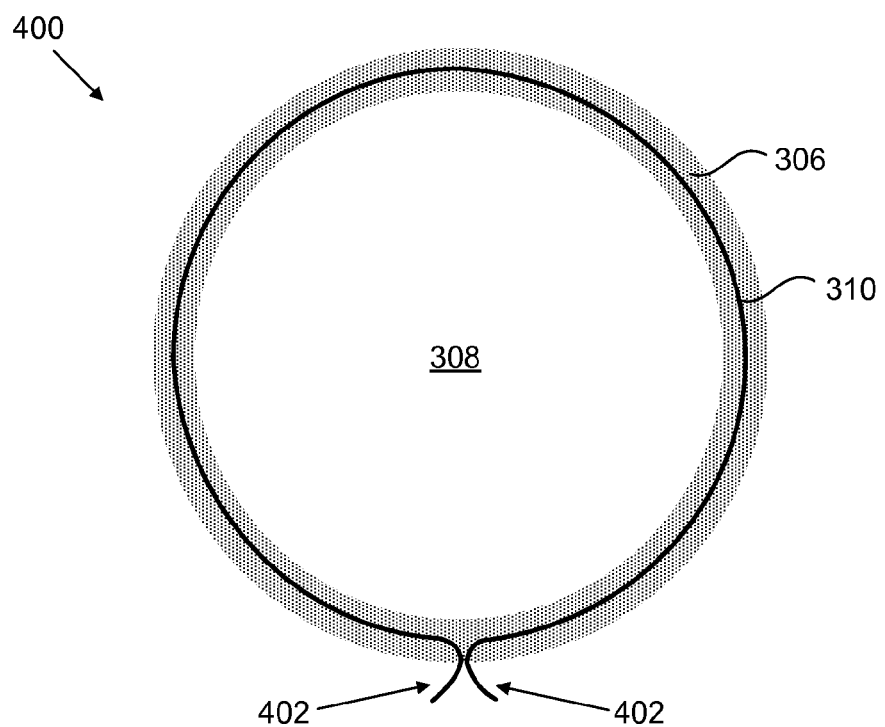
FIG. 4 shows an elongated bead of liquid adhesive having an embedded thread after being dispensed onto a substrate.

FIG. 4 shows an elongated bead 400 of liquid adhesive 306 having embedded thread 310 after being dispensed onto substrate 308. As shown, elongated bead 400 is formed into a circular shape onto substrate 308. Elongated bead 400 includes thread 310 embedded within, which is sufficiently flexible so as to be bent into the circular shape. Note that although elongated bead 400 has circular shape, embodiments described herein include liquid adhesive beads that can have any shape. For example, some applications can call for a rectangular or square shaped embedded liquid adhesive elongated bead. As shown, thread 310 has ends 402 which protrude out of liquid adhesive 306. In alternative embodiments, the thread is fully embedded within the liquid adhesive. After elongated bead 400 is dispensed onto substrate 308, a second substrate (not shown) can be aligned with and placed onto substrate 308. Note that in some embodiments, additional portions of liquid adhesive (not shown) can be applied to additional surfaces of substrate 308 prior to placement of the second substrate. For example, elongated bead 400 can be a high viscosity dam liquid adhesive and a second portion of low viscosity liquid adhesive (not shown) can be dispensed in the central region of the substrate encompassed by elongated bead 400. In some cases, thread 310 can enhance the ability of a dam liquid adhesive to retain a less viscous liquid adhesive applied to portions of substrate 308 encompassed by the circular perimeter of elongated bead 400 by surrounding and preventing the less viscous liquid adhesive from dispensing onto predetermined portions of substrate 308. The predetermined portions of substrate 308 can include, for example, electrical contact pads.

In some embodiments, thread 310 embedded can be activated during a curing process to cure portions of liquid adhesive 306 that are proximate to thread 310. Activating thread 310 can be done, for example, by using thread 310 as a heat source or a UV light source. This allows internal portions of liquid adhesive 306, which can be slower to cure, to cure at a faster rate. Activating thread 310 can be used as a primary or secondary source for curing liquid adhesive 306. In order to activate thread 310, in preferred embodiments, one or both ends 402 of thread 310 can be adjusted so as to protrude out of the perimeter of both substrates such that ends 402 can be accessed once the two substrates are placed together for the curing process. In some embodiments, thread 310 includes a conductive material, such as a metal, which can be connected via ends 402 to a voltage source to cause a current to flow though thread 310. The current can generate heat along thread 310, which can in turn be transferred to adjacent liquid adhesive 306. The heat can then cause the liquid adhesive proximate to thread 310 to cure. This heat source can be secondary to another source for curing elongated bead 400. For example, current can be allowed to flow through thread 310 in conjunction with UV light being shined on elongated bead 400. In some cases, current can be allowed to flow through thread 310 while substrate 308 is heated or exposed to moisture (depending upon the type of liquid adhesive and type of application). In some cases current can be allowed to flow through thread 310 in combination with UV exposure, substrate heating and moisture exposure. In other cases, the current flowing through thread 310 can be the sole source of curing of elongated bead 400.

In some embodiments, thread 310 is made of a non-conductive material. For example, thread 310 can be made of a flexible resinous or glass material. In some embodiments, thread 310 is made of an optical fiber material, such as a fiber optic cable, that is suitable for propagating and scattering UV light within elongated bead 400. The UV light scattered from the thread 310 can be used as a source for curing liquid adhesive 306. In practice, one or both ends 402 can be connected to a light source which causes light to transmit through thread 310. Liquid adhesive 306 which is adjacent to thread 310 can then become exposed to UV light and cured. The scattered UV light from thread 310 can be a primary or secondary source for curing elongated bead 400. For example, UV light scattered from thread 310 can be in conjunction with UV light being shined on elongated bead 400 from another source. In some cases, UV light scattered from thread 310 can be used in conjunction substrate 308 being heated or exposed to moisture (depending upon the type of liquid adhesive and type of application). In some cases UV light scattered from thread 310 can be done in combination with exposure to UV light from another source, substrate heating and moisture exposure. In other cases, the UV light scattered from thread 310 can be the sole source of curing of elongated bead 400.

As described above, thread 310 can be used as a primary or secondary source of energy to cure liquid adhesive 306. The use of activated thread 310 as a curing source can be especially effective in applications where the liquid adhesive is opaque. In these cases, it can be difficult to adequately expose the entirety of the liquid adhesive to UV light once it is disposed between substrates. If the substrates are also opaque, the liquid adhesive can be precluded from exposure to UV light. Thread 310 once activated can be used to solve this problem by providing an energy source for curing these hard to reach liquid adhesives.

Figure 5A:
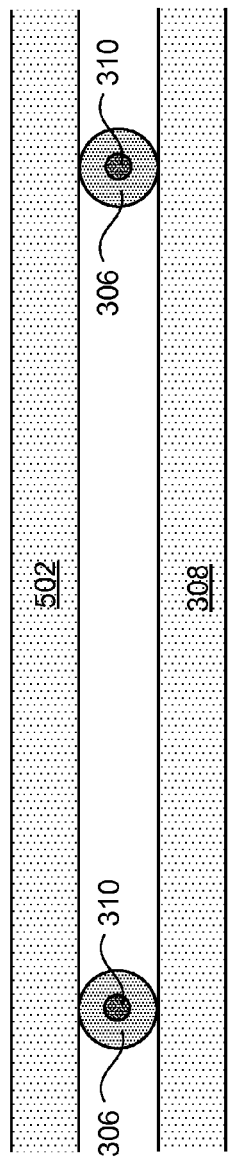
FIGS. 5A and 5B show cross section views of a portion of composite layered structure with liquid adhesive undergoing a curing process.
Figure 5B:
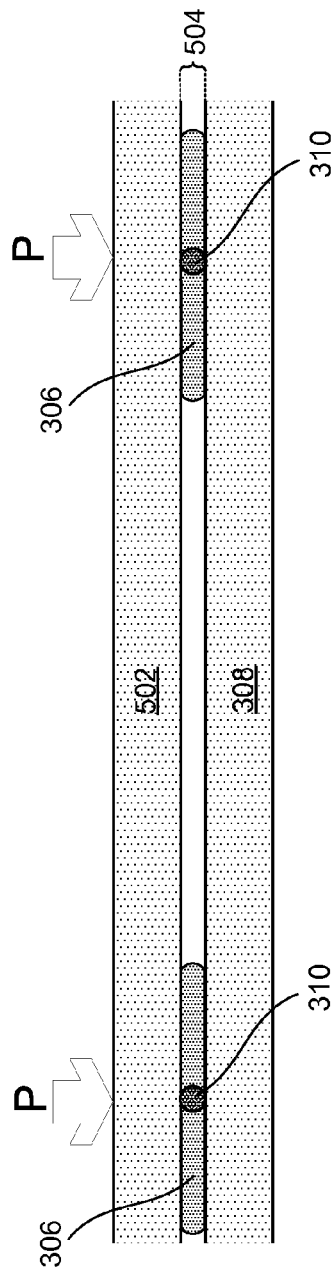

Another advantage of having thread 310 embedded within elongated bead 400 is that thread 310 can used to provide a consistent gap or distance between adjacent substrates being bonded together. To accomplish a consistent gap, in one embodiment, thread 310 is a rigid thread structure that has a diameter that remains fixed during the curing process. FIGS. 5A and 5B show cross section views of a portion of composite layered structure 500 undergoing a curing process. The cross section views show two sides of liquid adhesive 306 having embedded thread 310 applied in an elongated bead applied around the perimeter of first substrate 308. At FIG. 5A, second substrate 502 is aligned and positioned over first substrate 308. At FIG. 5B, pressure P is applied to composite structure 500, for instance on top surface of second substrate 502. In response to the applied pressure P, liquid adhesive 306 is compressed and is displaced laterally along the surfaces of substrates 308 and 502. Thread 310 has a diameter that remains substantially fixed during the application of pressure P. Thread 310 is then activated using current or UV light as described above to cure liquid adhesive 306 while pressure P is applied. After liquid adhesive 306 is suitably cured, pressure P is removed and substrate 308 is bonded with second substrate 502. In this way, a composite layered structure 500 can have a consistent gap or distance 504 formed between substrates 308 and 502. Alternative embodiments where a thread having a diameter which is compressible to a predetermined distance are described below with reference to FIGS. 12C-12D. It should be noted that the embodiments shown in FIGS. 5A and 5B show thread 310 having a circular diameter. In alternative embodiments threads having diameters of different shapes can be used. For example, a thread having a substantially flat diameter, such as a ribbon or foil, can be used. In other embodiments, a thread having a square, triangular or oval shaped diameter can be used. In some embodiments, a thread having different diameters at different portions along the thread is used.

Figure 6A:
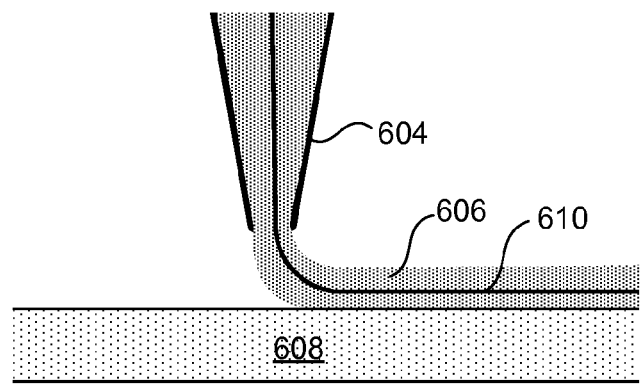
FIGS. 6A-6C show three separate ways to provide an elongated bead of liquid adhesive having a thread in accordance with described embodiments.
Figure 6B:
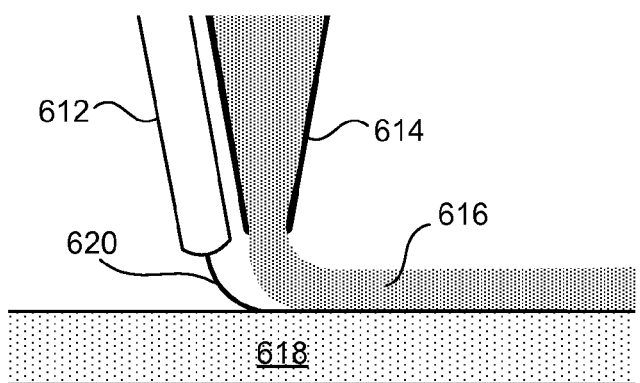
Figure 6C:
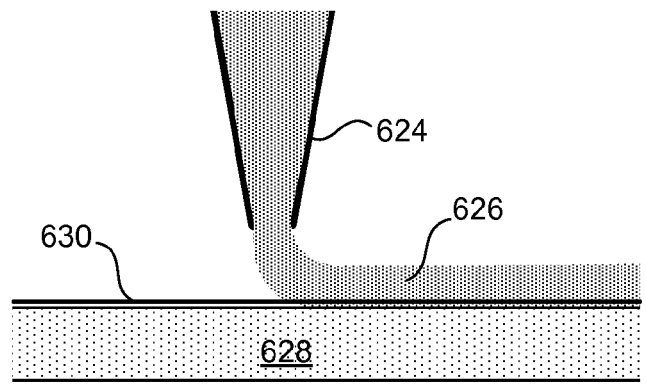

FIGS. 6A-6C show three separate ways to provide an elongated bead of liquid adhesive having a thread in accordance with described embodiments. At FIG. 6A, liquid adhesive 606 is dispensed through dispensing tip 604 onto substrate 608. Thread 610 is dispensed from the same dispenser and dispensing tip 604 as liquid adhesive 606. At FIG. 6B, thread 620 is separately dispensed using thread dispenser 612 onto substrate 618. Using a separate dispensing tip 614, liquid adhesive 616 is dispensed onto substrate 618. In this way, thread 620 becomes covered by liquid adhesive 616 on substrate 618. Note that thread dispenser 612 and dispensing tip 614 can be part of a single dispensing tool or separate dispensing tools. In alternative embodiments, thread dispenser 612 is positioned after dispensing tip 614 such that liquid adhesive 616 is dispensed onto substrate 618 prior to thread 620. At FIG. 6C, thread 630 is positioned on substrate 628 first. In some cases thread 630 is secured onto substrate 628 using, for example, an adhesive (e.g., conductive adhesive) or a welding process. In some cases thread 630 is situated within a feature on substrate 628, such as a groove, that can align and support the position of thread 630 on substrate 628. Next, dispensing tip 624 is used to dispense liquid adhesive 626 over thread 630 and onto substrate 628. In alternative embodiments, a thread can be applied after the glue is laid down, either immediately after as part of the same process, or later in a separate process. Note that the thread in each of the embodiments shown in FIGS. 6A-6C can be located in different positions within the liquid adhesive and relative to the substrate. For example, since thread 630 is dispensed first onto substrate 628 at FIG. 6C, the position of thread 630 can stay in contact with substrate 628 after liquid adhesive 626 is dispensed and during a subsequent curing process. In contrast, thread 610 at FIG. 6A can be fully encompassed by liquid adhesive 606. In some cases this can mean thread 610 will not contact substrate 608 during the curing process. Different relative positions of the thread, liquid adhesive and substrate can be used for different applications.

Figure 7:
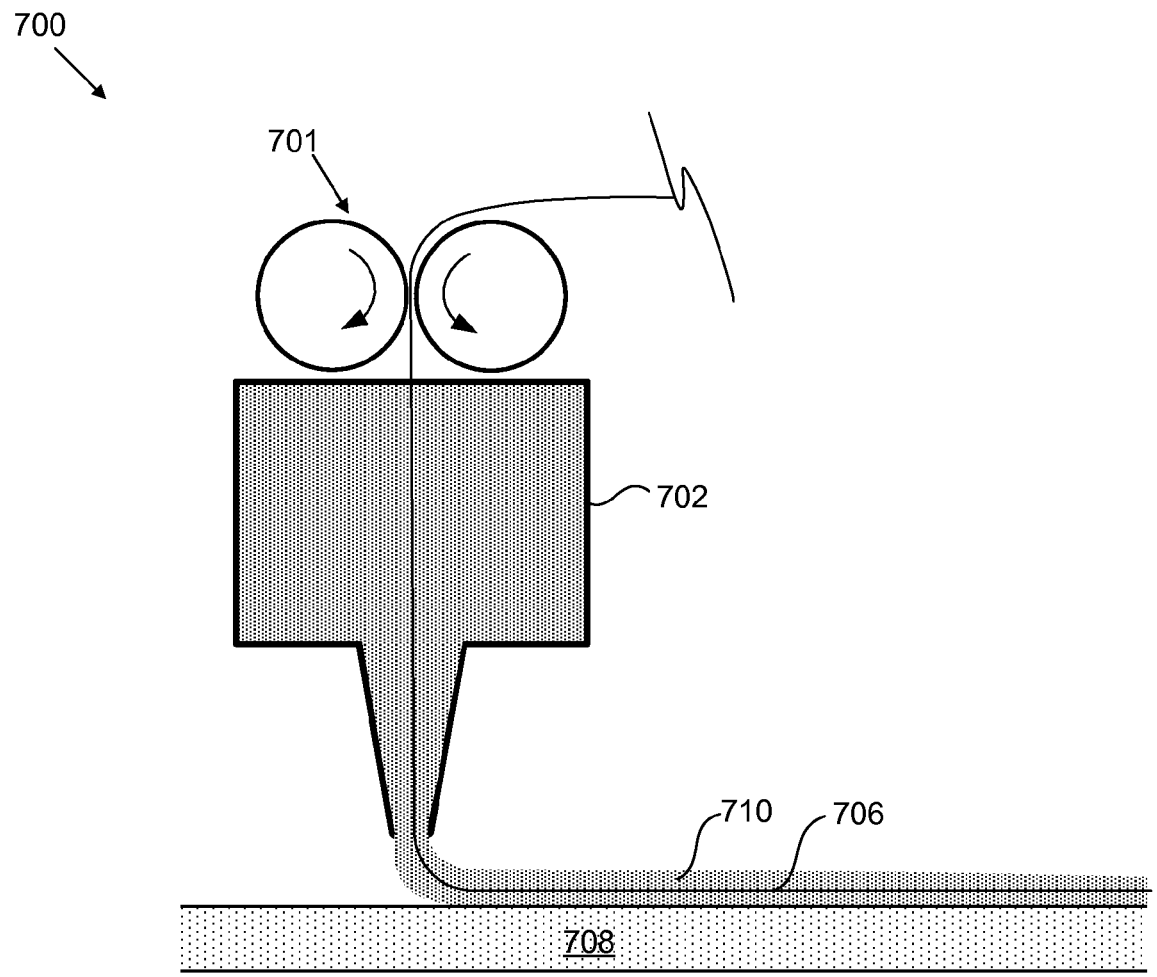
FIG. 7 shows a liquid adhesive dispensing assembly which includes a dispenser and a bending apparatus.
Figure 8A:
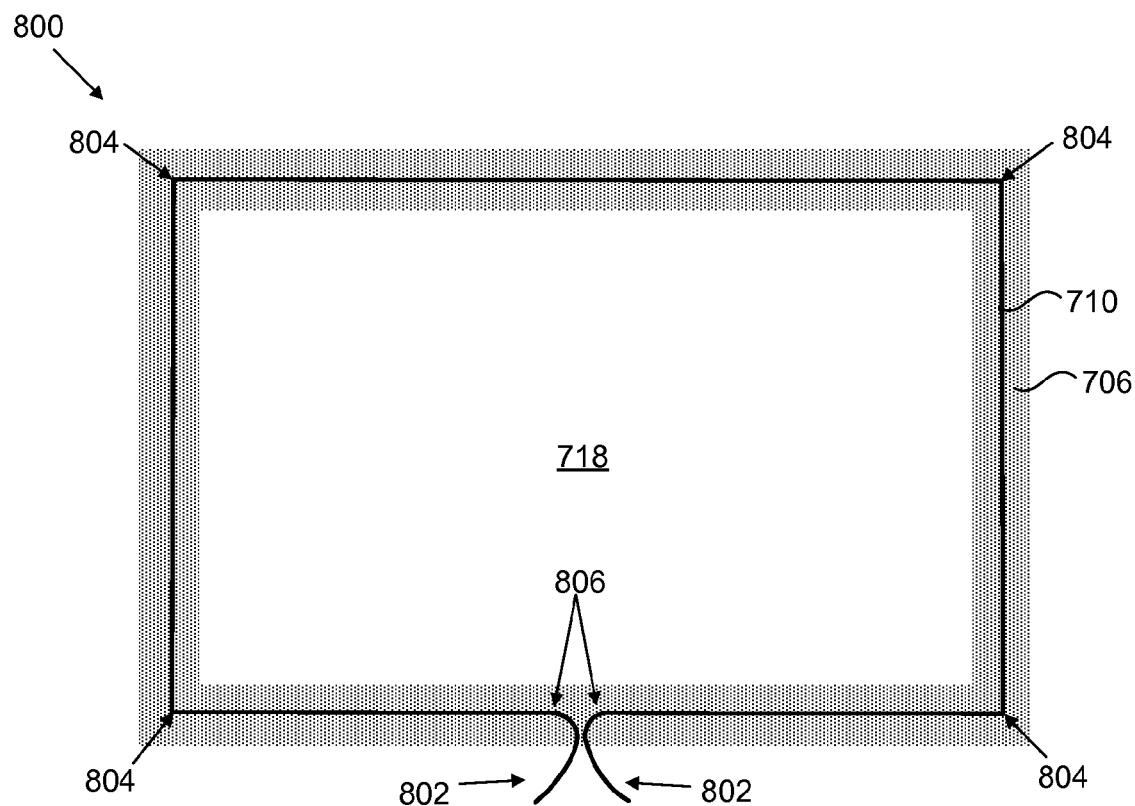
FIGS. 8A-8C show three embodiments of elongated beads of liquid adhesive having embedded threads after being dispensed onto substrates.

In some embodiments, the thread is bent to conform to a certain shape. For example, the thread can be bent into a circular shape (e.g., FIG. 4) a rectangular shape or square shape. FIG. 7 shows a liquid adhesive dispensing assembly 700 which includes a dispenser 702 and a bending apparatus 701. Bending apparatus 701 is configured to bend thread 710 prior to being dispensed onto substrate 708 along with liquid adhesive 706. In one embodiment, bending apparatus 701 includes rollers or mechanical devices to mechanically bend thread 710. In some embodiments, bending apparatus includes a heating device that can heat thread 710 to assist the mechanical bending process. FIG. 8A shows an elongated bead 800 of liquid adhesive 706 having embedded thread 710 after being dispensed onto substrate 708. As shown, elongated bead 800 is formed into a rectangular shape. Thread 310 includes corners 804 and curved portions 806 which can be bent using bending apparatus 701. Thread 710 has ends 802 which protrude out of liquid adhesive 706, which can be used to facilitate activation of thread 710 during a curing process, as described above.

Another advantage of providing a thread embedded in a composite layered structure is that the thread can be used to facilitate disassembly of the composite layered structure during a rework or disassembly process. A rework is generally done during the assembly process, such as when defects are found in the composite structure after a pre-curing process. As described above, a pre-curing process typically involves partially curing substrates together and then performing a visual inspection to check for defects such as bubbles, foreign particles, mis-alignment, etc. If a defect is found, the substrates can be taken apart, cleaned and re-assembled. A thread embedded in a cured or partially cured liquid adhesive can be used to facilitate taking apart the substrates during a rework process. For example, referring back to FIG. 8A, if a defect is found in elongated bead 800 after a pre-curing process, thread 710 can be pulled by the one or both protruding ends 802 to facilitate separation of the substrates. When one or both protruding ends 802 are pulled in lateral directions with respect to the substrate surfaces, the applied force can cause thread 710 to tear or cleave portions of elongated bead 800 and thereby facilitate in mechanically separating the corresponding substrates (not shown). The separated substrates can then be cleaned and re-assembled. This cleaving process can also be used for disassembling a composite layer structure after it has been fully assembled, i.e., not just for a rework process. In some embodiments one or both ends 802 can have one or more grasping features to assist gripping and pulling of one or both ends 802. The grasping feature can be, for example, a plastic portion that creates effective gripping diameters on ends 802 that are larger than the remainder of thread 310 and make it easier for a person or robot to grasp ends 802.

An additional way that thread 710 can be used to facilitate the separation of substrates during a rework or disassembly process is by activating thread 710 after liquid adhesive 706 is cured. For example, if a defect is found in elongated bead 800 during a pre-curing process, thread 710 can be reactivated to soften or burn already cured portions of liquid adhesive 706. The softened or burned portions of cured liquid adhesive 706 can destroy the bonding capability of liquid adhesive 706, thereby causing the corresponding substrates to separate. Reactivating thread 710 can involve, for example, applying a voltage across it if thread 710 is a conductive material or shining UV light through it if thread 710 is an optical fiber. In some embodiments, re-activation of thread 710 can be done in conjunction with the pulling of one or both protruding ends 802 to separate bonded substrates.

Figure 8B:
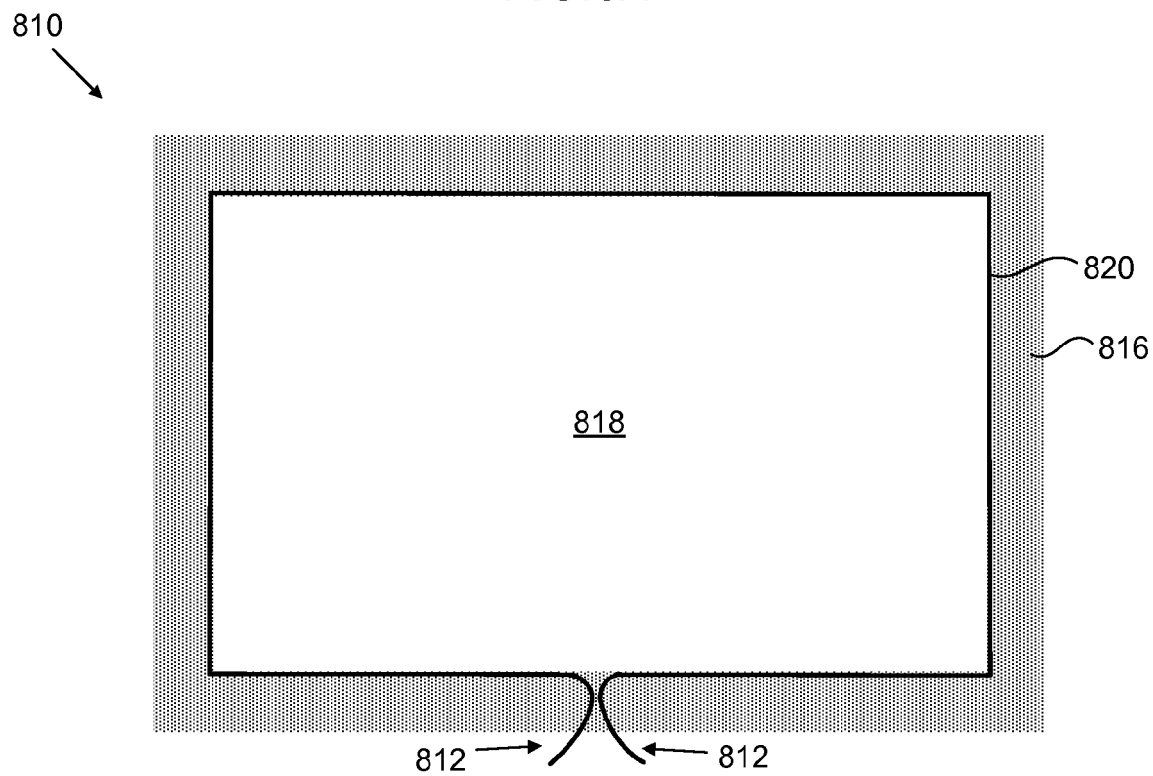
Figure 8C:
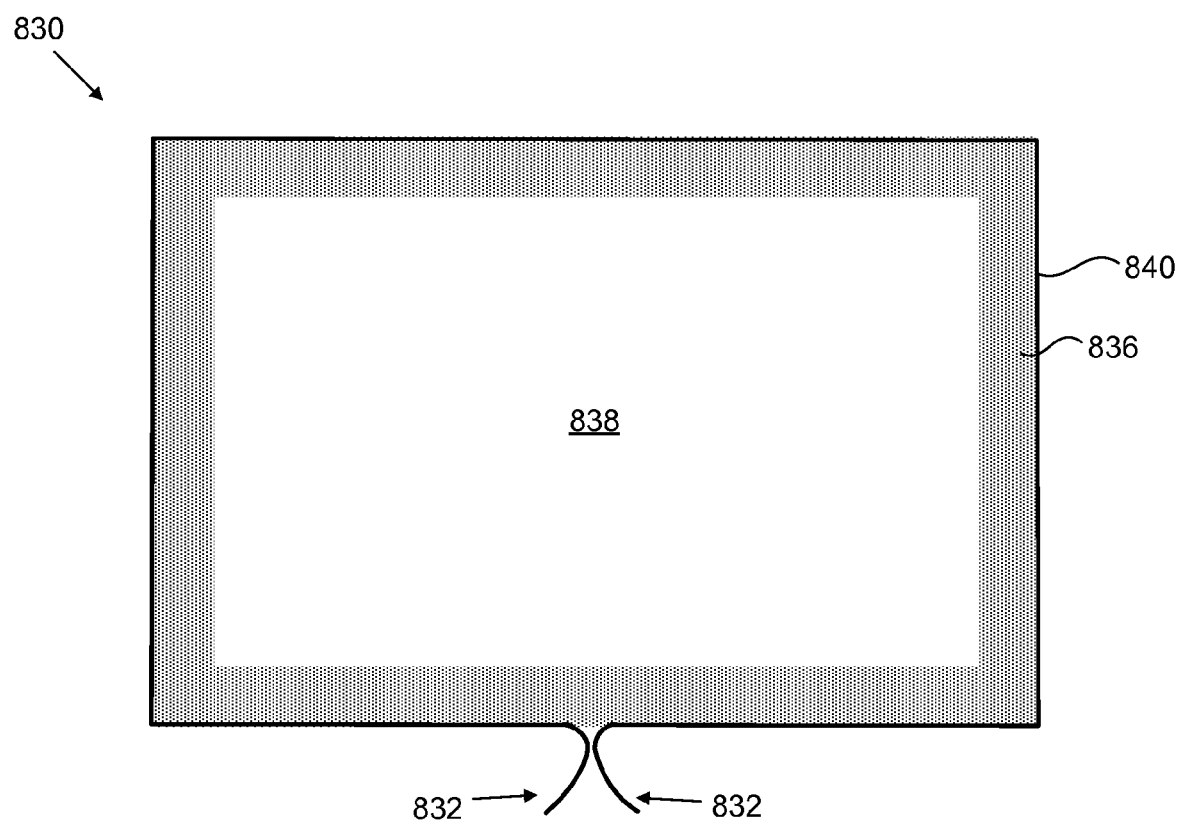

Elongate bead 800 shows thread 710 substantially centered within liquid adhesive 706. In alternative embodiments, the thread can be situated in a location within the liquid adhesive to maximize the cleaving action of the thread. For example, FIG. 8B shows an elongated bead 810 having thread 820 which are disposed on substrate 818. As shown, thread 820 is biased toward the interior perimeter of elongated bead 810. If a defect is found in elongated bead 810 after a pre-curing process, one or both protruding ends 812 can be pulled in a lateral direction to tear portions of elongated bead 810 and thereby mechanically separate the corresponding substrates. Since thread 820 is located at the interior perimeter of elongated bead 810, thread 820 will cleave a majority of liquid adhesive 816 bonding the two substrates together. The separated substrates can then be cleaned and re-assembled. This cleaving process can also be used for disassembling a composite layer structure after it has been fully assembled, i.e., not just for a rework process. An alternative embodiment is shown at FIG. 8C, which shows elongated bead 830 which includes thread 840, which are disposed on substrate 838. Thread 840 includes protruding ends 832. As shown, thread 840 is biased toward the exterior perimeter of elongated bead 830. In this embodiment, thread 840 can act to retain liquid adhesive 836 within a predefined perimeter, such as in the case where liquid adhesive 836 is used as a dam liquid adhesive as described above.

Figure 9:
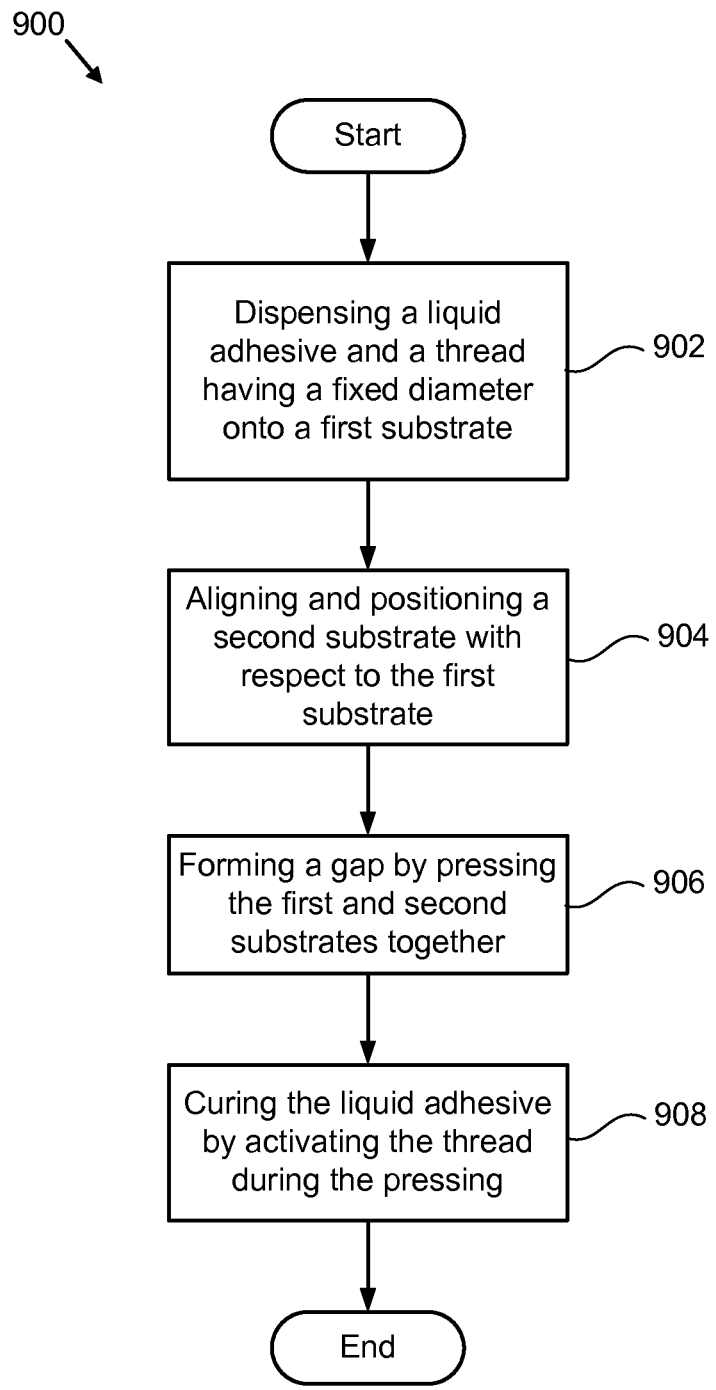
FIG. 9 shows a flowchart detailing a process for forming a composite structure in accordance with described embodiments.

FIG. 9 shows flowchart 900 detailing a process for forming a composite structure in accordance with described embodiments. At 902, a liquid adhesive and a thread having a fixed diameter are dispensed onto a first substrate. As described above, the thread can be dispensed along with the liquid adhesive using a dispenser. In these embodiments, it is preferable that the thread has a stiffness that to suitably feed the thread through the dispenser. In some embodiments, the thread is flexible enough to be bent into a predefined shape, such as a rectangle or circle, onto the first substrate. Viscous forces from liquid adhesive on thread can facilitate the dispensing of the liquid adhesive. At 904, a second substrate is aligned and positioned with respect to the first substrate. At 906, a gap or distance between substrates is consistent with the fixed diameter of the thread is formed by pressing the first and second substrates together. At 908, the thread is activated to cure at least a portion of the liquid adhesive. In some embodiments, the thread can be activated while pressure is applied. In some embodiments, the thread can be activated after the pressure is removed. In one embodiment, the glue application and pressing can happen in one fixture, and the units can then be quickly moved off for the thread to be activated in a different more storage friendly location. As described above, activation of the thread can include applying a voltage across the thread or shining a UV light source through the thread.

Figure 10A:
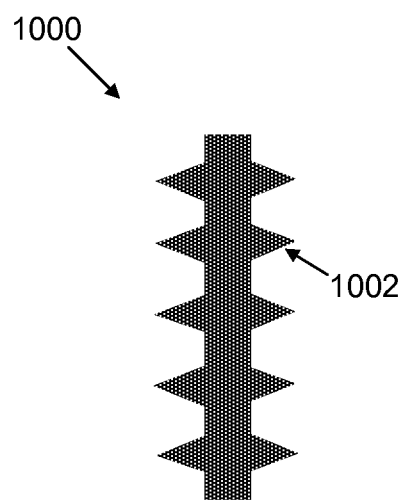
FIGS. 10A and 10B show cross-section views of portions of threads which have cutting features in accordance with some embodiments.
Figure 10B:
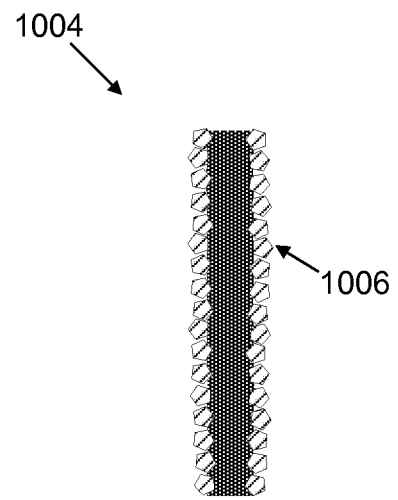

In order to promote the cleaving action of a thread encased in a cured liquid adhesive, in some embodiments the thread can have cutting features that cut portions of the cured liquid adhesive during a disassembly process. FIGS. 10A and 10B show cross-section views of portions of threads 1000 and 1004 which have cutting features in accordance with some embodiments. Thread 1000 has conical barbs 1002 which can have sharp points that can enhance the cutting and tearing action of thread 1000. Thread 1004 has abrasive particles 1006 embedded on exterior surfaces of thread 1004. Abrasive particles 1006 can include, for example, diamond, glass, metal or plastic particles. In preferred embodiments, abrasive particles 1006 have sharp edges and/or points to promote cutting and tearing of surrounding cured liquid adhesive.

Figures 11A, 11B:
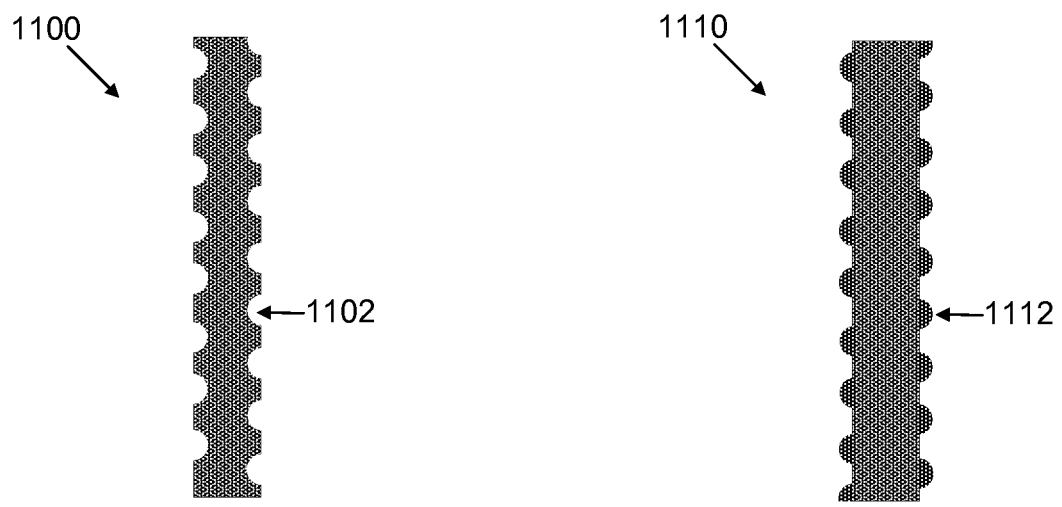
FIGS. 11A and 11B show cross-section views of portions of threads which include features that can mechanically assist the dispensing of liquid adhesive.

In some embodiments, the thread has features that can facilitate the dispensing of liquid adhesive onto a substrate. FIGS. 11A and 11B show cross-section views of portions of threads 1100 and 1110 which include features that can mechanically assist the dispensing of liquid adhesive. During a dispensing operation, threads 1100 and 1110 can be dispensed along with liquid adhesive from a dispenser such as dispenser 302 shown in FIG. 3. Thread 1100 has notches 1102 which can scoop more quantities of liquid adhesive while being dispensed onto a substrate compared to using a thread without notches 1102. Thread 1110 has knobs 1112 which can help push larger quantities of liquid adhesive while being dispensed onto substrate compared to using a thread without knobs 1112. Facilitating liquid adhesive dispensing may be particularly beneficial if the liquid adhesive has a high viscosity. Although threads 1100 and 1110 have notches 1102 and knobs 1112, respectively, features having any suitable shape and size can be used. Note that in some embodiments a thread has both liquid dispensing facilitating features and cutting features, such as those shown in FIGS. 10A and 10B.

Figure 12A:
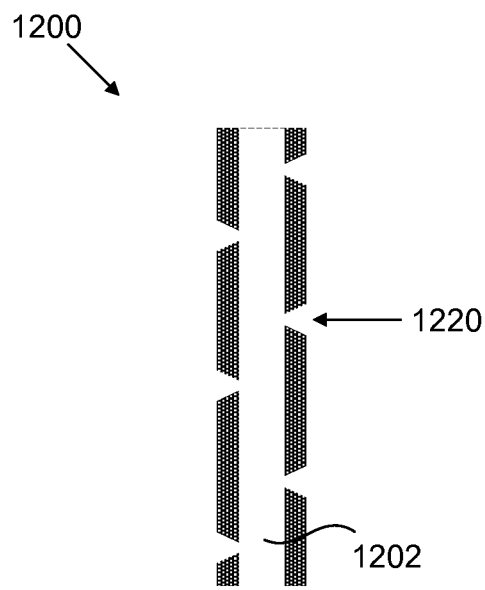
FIGS. 12A-12D show views of threads in the form of tubes having a central cavity and apertures to facilitate dispensing of liquid adhesive.
Figure 12B:
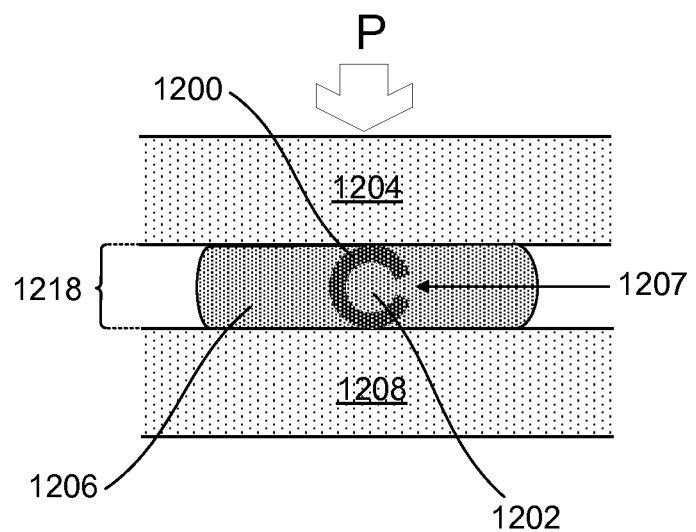

In some embodiments, the thread can be a tube having a central cavity to facilitate the dispensing of liquid adhesive onto a substrate. One such embodiment is shown in FIG. 12A, which shows a cross section view of tube 1200 having a central cavity 1202 disposed within. Tube 1200 includes apertures 1220 that are formed through the outer surface to the inner surface of tube 1200. In the embodiment shown in FIG. 12A, the diameters of apertures 1220 at the outer surface of tube 1200 are larger than the diameters of apertures 1220 at the inner surface of tube 1200. In alternative embodiments, the outer diameters of the apertures are smaller or the same as than the inner diameters of the apertures. During a liquid adhesive dispensing process, liquid adhesive can be forced through cavity 1202 and apertures 1220. FIG. 12B shows a cross section view of tube 1200 after being dispensed onto substrate 1208. As shown, liquid adhesive 1206 has been forced through cavity 1202 and aperture 1207 and dispensed onto substrate 1208. During the curing process, substrate 1204 is then aligned and placed onto substrate 1208 and pressure P is applied. In the embodiment shown in FIG. 12B, tube 1200 has a fixed diameter that is non-compressible by applied pressure P, thereby providing a consistent gap or distance 1218 between substrates 1204 and 1208.

Figure 12C:
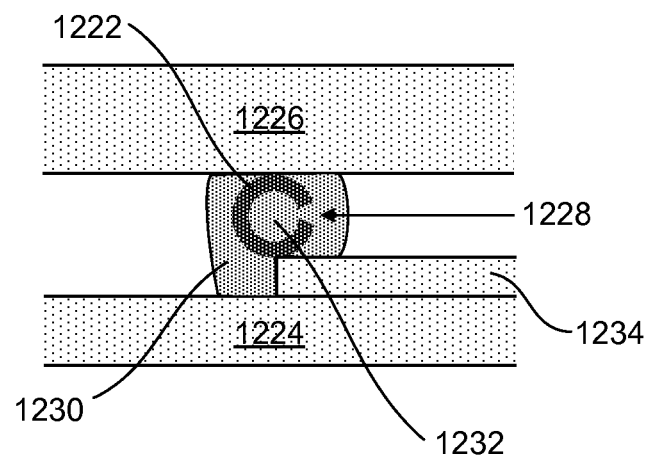
Figure 12D:
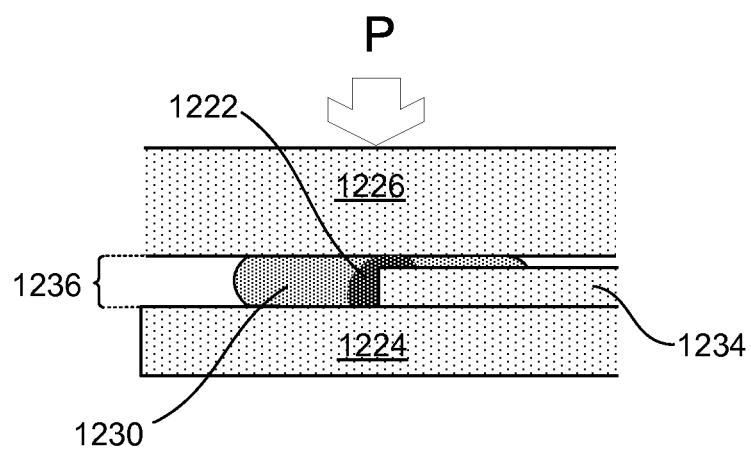

In some embodiments, the tube can have a compressible diameter that is compressible to a predetermined thickness. FIG. 12C shows a cross section view of tube 1222 having cavity 1232 which is disposed between substrates 1224 and 1226. Liquid adhesive 1230 has been forced through cavity 1232 and aperture 1228. Note that in the embodiment shown, tube 1222 and liquid adhesive 1230 are position over an edge of secondary component 1234. Secondary component 1234 can be, for example, a component such as a flex cable or a secondary substrate used in conjunction with a display or touch sensor layer stack. At FIG. 12D, pressure P is applied to tube 1222 during a curing process such that aperture 1232 is compressed and the diameter of tube 1222 is compressed to a predetermined thickness 1236. Note that although aperture 1232 is compressed, tube 1222 is compressed to a predetermined thickness which can be reliably reproduced, thereby creating a consistent gap or distance 1236 between substrates 1224 and 1226.

Figure 12E:
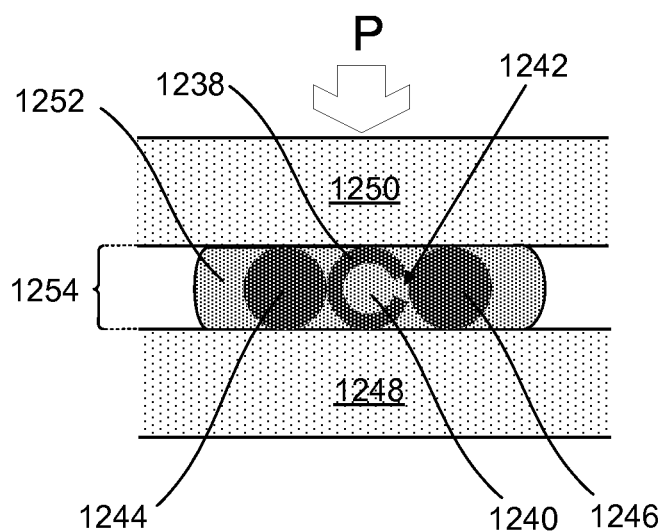
FIG. 12E shows a cross section view of a compressible tube and fixed diameter threads disposed between substrates.

In some embodiments, the tube having a compressible diameter can be used in combination in conjunction with threads or tubes having fixed diameters. FIG. 12E shows a cross section view of compressible tube 1238 disposed between substrates 1248 and 1250. As shown, threads 1244 and 1246 that each has fixed diameters are positioned adjacent to compressible tube 1238. Liquid adhesive 1252 can forced through cavity 1240 and aperture 1242 during a dispensing procedure. During a curing process, pressure P can be applied to the substrates. Since threads 1244 and 1246 have fixed diameters, gap 1254 remains fixed in accordance with the fixed diameters of threads 1244 and 1246 while pressure P is applied. In alternative embodiments, more or fewer fixed diameter threads and/or compressible tubes can be used.

Figure 13A:
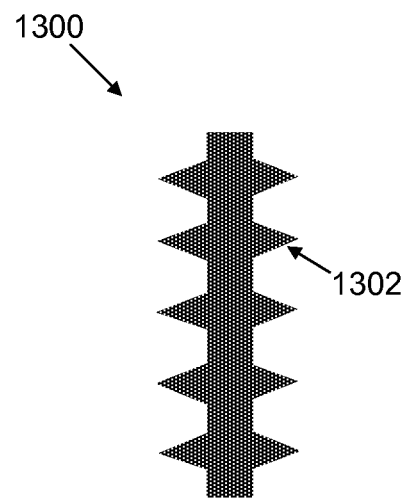
FIGS. 13A and 13B shows cross section views of an electrically conductive thread which includes projections that can be used to facilitate electrical contact between substrates.
Figure 13B:
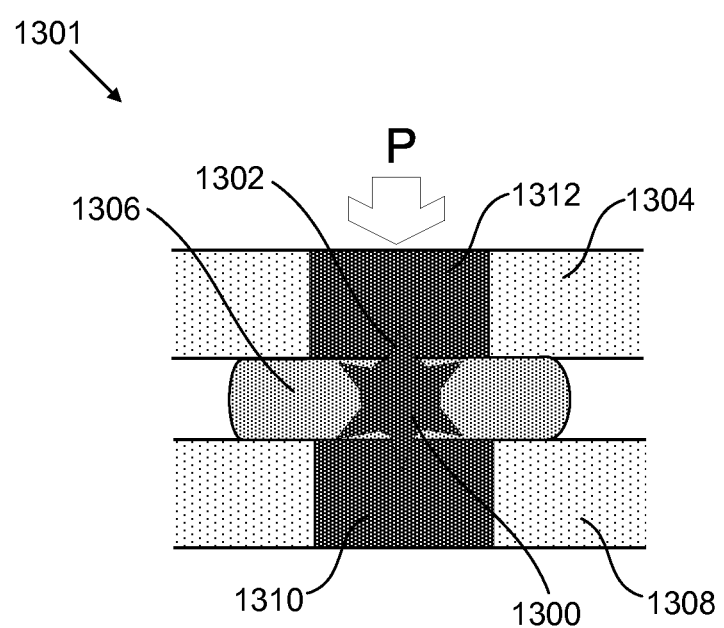

In some embodiments, the thread has features that can provide electrical contact with electrically conductive portions of one or both of the substrates. FIG. 13A shows a cross section view of electrically conductive thread 1300 which includes projections 1302 that can be used to facilitate electrical contact between substrates. FIG. 13B shows a cross section view of a portion of composite layered structure 1301, which includes electrically conductive thread 1300, during a curing process. Composite layered structure 1301 includes first substrate 1308 having electrically conductive portion 1310 and second substrate 1304 having electrically conductive portion 1312. Conductive portions 1310 and 1312 can be, for example, grounding strips. In some embodiments, conductive portions 1310 and 1312 are pieces of conductive tape that are adhered onto substrates 1308 and 1304, respectively. In other embodiments, conductive portions 1310 and 1312 are metal portions that have been soldered onto substrates 1308 and 1304, respectively. As shown, projections 1302 of electrically conductive thread 1300 can be configured to extend beyond portions of surrounding liquid adhesive 1306 when pressure P is applied to composite layered structure 1301. In this way, projections 1302 can make physical and electrical contact with electrically conductive portions 1310 and 1312 of substrates 1308 and 1304, respectively. In some cases projections 1302 can pierce through portions of conductive portions 1310 and 1312 to provide good electrical contact. In some embodiments, electrical contact between electrically conductive thread 1300 and conductive portions 1310 and 1312 can be used to provide an alternating or direct current grounding path. In other embodiments, electrical contact between electrically conductive thread 1300 and conductive portions 1310 and 1312 can be used to electrically connect various components of substrates 1308 and 1304. Projections 1302 shown in FIGS. 13A and 13B are shown as having a conical shape with sharp ends. It should be noted that projections having any suitable shapes for providing electrical contact between conductive portions 1310 and 1312 can be used.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium can be any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of forming a composite structure having a first substrate and a second substrate, comprising:
    dispensing a liquid adhesive conglomerate onto a portion of a first substrate, wherein the liquid adhesive conglomerate comprises a fiber optic cable disposed within a liquid adhesive, the liquid adhesive curable by exposure to ultraviolet light;
    aligning the second substrate with respect to the first substrate;
    forming a gap between the first and second substrates by pressing the first and second surfaces together, the gap having a distance in accordance with a diameter of the fiber optic cable; and
    during the pressing, curing the liquid adhesive by passing ultraviolet light through the fiber optic cable so as to expose the liquid adhesive to ultraviolet light, wherein the gap remains in accordance with the diameter of the fiber optic cable after the liquid adhesive is cured.

2. The method of claim 1, wherein the ultraviolet light scatters within the fiber optic cable so as to expose the liquid adhesive during a curing process.

3. The method of claim 1, wherein the fiber optic cable has a first end and a second end which protrude from the composite structure.

4. The method of claim 1, wherein the fiber optic cable is configured to facilitate the disassembly of the composite structure after the liquid adhesive is cured.

5. The method of claim 4, further comprising:
    subsequent to curing the liquid adhesive, disassembling the composite structure by pulling the fiber optic cable in a lateral direction with respect to the first and second substrates to cleave at least a portion of the cured liquid adhesive.

6. The method of claim 5, wherein the fiber optic cable comprises cutting features that cut portions of the cured liquid adhesive to facilitate the disassembly of the composite structure.

7. The method of claim 4, further comprising:
    reactivating the fiber optic cable by passing ultraviolet light through the fiber optic cable to soften or burn the cured liquid adhesive and destroy a bonding capability of the cured liquid adhesive to facilitate the disassembly of the composite structure.

8. The method of claim 5, wherein the composite structure is part of a touch sensitive display assembly for an electronic device.

9. The method of claim 4, wherein the fiber optic cable has a first and a second end which protrude from the composite structure, wherein the fiber optic cable is reactivated by passing ultraviolet light through the fiber optic cable via the first end or the second end of the fiber optic cable.

10. The method of claim 1, further comprising:
    during the dispensing, bending the fiber optic cable into a predetermined shape onto the first substrate.

11. The method of claim 1, wherein the liquid adhesive and fiber optic cable are dispensed simultaneously from a dispenser.

12. A composite structure, comprising:
a first substrate having a first surface;
a second substrate having a second surface;
a cured adhesive disposed between the first and second surfaces; and
fiber optic cable disposed within the cured adhesive and between the first and second surfaces, wherein a gap between the first and second surfaces has a distance in accordance with a diameter of the fiber optic cable, wherein the cured adhesive was formed from a liquid adhesive that was cured by a curing process wherein ultraviolet light was passed through the fiber optic cable so as to cure at least a portion of the liquid adhesive.

13. The composite structure of claim 12, wherein the composite structure is part of a touch sensitive display assembly for an electronic device.

14. The composite structure of claim 12, wherein the cured adhesive is an optically clear adhesive.

15. The composite structure of claim 12, wherein during the curing process, the ultraviolet light is scattered within the fiber optic cable so as to expose the liquid adhesive to the ultraviolet light.

16. The composite structure of claim 12, wherein the fiber optic cable has a first end and a second end which protrude from the composite structure.

17. The composite structure of claim 12, wherein the fiber optic cable is configured to facilitate disassembly of the composite structure.

18. The composite structure of claim 17, wherein the fiber optic cable has a first end and a second end which protrude from the composite structure, the fiber optic cable configured to be pulled by the first or second end in a lateral direction with respect to the first and second surfaces to cleave at least a portion of the cured adhesive.

19. The composite structure of claim 18, wherein the first or second end comprises a grasping feature to assist gripping and pulling of the first or second end.

20. The composite structure of claim 18, wherein the fiber optic cable comprises cutting features that are configured to cut portions of the cured adhesive to facilitate the disassembly of the composite structure.

21. The composite structure of claim 20, wherein the cutting features are comprised of abrasive particles embedded on exterior surfaces of the fiber optic cable.

22. The composite structure of claim 17, wherein the fiber optic cable is configured to be reactivated by passing ultraviolet light through the fiber optic cable.

23. The composite structure of claim 22, wherein the ultraviolet light from the reactivated fiber optic cable softens or burns the cured adhesive to destroy bonding capability of the cured adhesive.

24. A method of forming a composite structure having a first substrate and a second substrate, comprising:
dispensing a fiber optic cable disposed within a liquid adhesive onto a portion of a first surface of the first substrate, the liquid adhesive curable by exposure to ultraviolet light;
aligning a second surface of the second substrate with respect to the portion of the first surface;
pressing the first and second surfaces together such that a gap is formed between the first and second surfaces, the gap having a distance in accordance with a diameter of the fiber optic cable;
during the pressing, curing the liquid adhesive by passing ultraviolet light through the fiber optic cable so as to expose the liquid adhesive to ultraviolet light, wherein the gap between the first and second surfaces has a distance that remains in accordance with the diameter of the fiber optic cable after the liquid adhesive is cured;
determining if rework of the composite structure is required; and
when it is determined that rework is required, reactivating the fiber optic cable by passing ultraviolet light though the fiber optic cable after the liquid adhesive is cured.

25. The method of claim 24, further comprising:
subsequent to reactivating the fiber optic cable, disassembling the composite structure by pulling the fiber optic cable in a lateral direction with respect to the first and second surfaces to cleave at least a portion of the cured liquid adhesive.

26. The method of claim 25, wherein the fiber optic cable has a first end and a second end which protrude from the composite structure, wherein pulling the fiber optic cable comprises grasping the first end and/or the second end to facilitate pulling of the fiber optic cable.

27. The method of claim 26, wherein the first end and/or the second end comprises a grasping feature to assist gripping and pulling of the first end and/or the second end.

28. The method of claim 24, further comprising:
during the dispensing, bending the fiber optic cable into a predetermined shape onto the first surface of the first substrate.

* * * * *